Patented Jan. 28, 1936

2,029,258

UNITED STATES PATENT OFFICE 2,029,258

ACID DYESTUFFS OF THE ANTHRAQUINONE SERIES AND A PROCESS OF PREPARING THEM

Ernst Diefenbach, Frankfort-on-the-Main, and Erich Fischer, Bad Soden-on-the-Taunus, Germany, assignors to General Aniline Works, Inc., New York, N. Y., a corporation of Delaware No Drawing. Application April 5, 1935, Serial No. 14,954. In Germany April 11, 1934

11 Claims. (Cl. 260—60)

The present invention relates to acid dyestuffs of the anthraquinone series and to a process of preparing them.

We have found that acid wool dyestuffs of the anthraquinone series of valuable tinctorial properties are obtainable by condensing a 1-amino-2-sulfo-4-halogen anthraquinone, for instance, a compound of the following general formula:

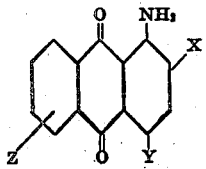

wherein X stands for a sulfo group,
Y for halogen and
Z may be hydrogen, halogen or a sulfo group advantageously in the presence of a copper salt and an acid binding agent with an aminoarylsulfamide of the following general formula:

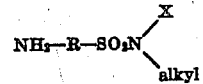

wherein X means hydrogen or a lower alkyl group,
R means an aryl radical of the benzene and naphthalene series and
alkyl means a lower alkyl group, at least one of the alkyl groups containing a hydroxy group.

The components are advantageously condensed by heating them together at a temperature between 50° C. and 100° C., for instance, at 60° C. to 70° C., until the formation of the dyestuff is finished. This is the case when the intensity of the color of the solution no longer changes or the anthraquinone compound used as parent material can no longer be detected with the microscope in a test portion taken from the reaction mixture.

One may also use such anthraquinones of the above formula in which X stands for halogen. In this case, the halogen atoms standing in 2-position of the anthraquinone is exchanged in known manner for the sulfo group after the condensation with the aminoarylsulfamide.

The products obtainable according to the present invention, for instance, the anthraquinone compounds containing in 1-position a NH2-group, in 2-position a sulfo group and in 4-position a

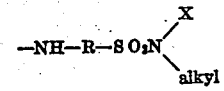

group wherein X means hydrogen or a lower alkyl group, R means an aryl radical of the benzene and naphthalene series and alkyl means a lower alkyl group, at least one of the alkyl groups containing a hydroxy group, are new.

The external OH-groups of the sulfamide radical determine a very good solubility and a very good levelling power of the condensation products so that the dyestuffs of this series are of considerable industrial interest.

The following examples serve to illustrate the invention but they are not intended to limit it thereto; the parts are by weight:

(1) 404 parts of sodium-1-amino-4-bromoanthraquinone-2-sulfonate in the form of an aqueous paste of 10% strength are heated at 60° C.– 70° C. with 338 parts of m-aminophenylsulfonic acid-dihydroxyethylamide, 200 parts of sodium bicarbonate and 10 parts of cuprous chloride until the formation of the dyestuff is finished. After cooling of the mixture, the dyestuff which has separated is filtered with suction and washed with dilute sodium chloride solution or hydrochloric acid. The product is further purified by dissolution in hot water and precipitation with hydrochloric acid of about 15% strength.

The dyestuff obtained forms a crystalline powder which is very easily soluble in water and dyes wool and silk very clear, somewhat reddish-blue tints of very good evenness.

(2) 48 parts of sodium-1-amino-4-bromoanthraquinone-2-sulfonate in the form of an aqueous paste of 42%, 46 parts of 1-aminobenzene-4-sulfodihydroxyethylamide, 400 parts of water, 24 parts of sodium bicarbonate and 3 parts of cuprous chloride are heated for 22 hours at 60° C. to 70° C., while stirring. After cooling, the dyestuff is precipitated by addition of NaCl and filtered with suction. The filter cake is stirred with 4 liters of hot hydrochloric acid of 3% strength and filtered off after cooling. Finally, it is dissolved in dilute ammonia, the solution is filtered and the dyestuff precipitated by means of hydrochloric acid. A crystalline product is obtained which has very similar tinctorial properties as the dyestuff described in Example 1.

(3) 21 parts of sodium-1-amino-4-bromoanthraquinone-2-sulfonate, 20 parts of 1-aminonaphthalene-5-sulfonic acid-dihydroxyethylamide, 20 parts of sodium bicarbonate, 2 parts of cuprous chloride and 250 parts of water are heated at 60° C. to 70° C., while stirring. When the condensation is finished, the cooled reaction mixture is filtered and the solid matter is washed with water. The filtrate which contains the dyestuff is diluted with twice its volume of water and hydrochloric acid is added in order to precipitate the condensation product. The whole is heated to boiling, while stirring, until the dyestuff becomes crystalline. The product is filtered with suction and further purified by re-dissolving in dilute sodium carbonate solution and precipitation by means of hydrogen chloride. There is obtained an easily soluble dyestuff which dyes wool and silk greenish-blue tints of very good fastness properties.

(4) 32 parts of sodium-1-amino-4-bromoanthraquinone-2-sulfonate, 35 parts of 1-amino-2-methoxyphenyl-5-sulfonic acid-dihydroxyethylamide, 16 parts of sodium bicarbonate and 1 part of cuprous chloride are heated for 20 hours at 70° C. in 350 parts of water. The dyestuff is isolated and purified in the usual manner. It dyes wool and silk clear blue tints of very good evenness.

(5) 20 parts of sodium-1-amino-4-bromoanthraquinone-2-sulphonate, 16 parts of 1-amino-3-methylbenzene-5-sulfonic acid-dihydroxyethylamide, 10 parts of sodium bicarbonate and 2 parts of cuprous chloride are heated in 500 parts of water at 70° C. for 24 hours. The product is isolated and purified and there is obtained a dyestuff of very good levelling power which is easily soluble and yields pure blue tints.

(6) By condensation of 1-amino-4-iodo-anthraquinone-2,6-disulfonic acid with 1-amino-2-methylbenzene-5-sulfonic acid-dihydroxyethylamide there is obtained in a similar manner a dyestuff which is very easily soluble, has a good levelling power and dyes wool and silk pure blue tints.

(7) By condensation of 2-aminotoluene-4-sulfonic acid-methylethanolamide of the following formula:

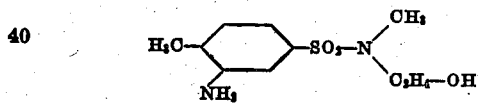

with 1-amino-4-bromoanthraquinone-2-sulfonic acid a dyestuff is obtained which dyes wool and silk clear blue tints of very good evenness.

(8) The bromine atom standing in 4-position of 1-amino-2,4-dibromoanthraquinone is exchanged for the m-aminophenylsulfone-dihydroxyethylamide by heating the components in presence of anhydrous potassium acetate, copper acetate and copper bronze in amyl-alcohol as solvent. There is obtained 1-amino-2-bromoanthraquinone-4-anilido-3'-sulfondihydroxyethylamide.

15 parts of this product are heated to boiling with 60 parts of phenol, 12 parts of potassium sulfite and 30 parts of water until the product has become soluble in water. The phenol is removed by steam-distillation and the dyestuff formed is isolated in the usual manner. It is identical with the dyestuff described in Example 1.

(9) 27 parts of sodum-1-amino-4-bromoanthraquinone-2-sulfonate, 26 parts of 1-aminophenyl-3-sulfonic acid-hydroxyethylamide, 12 parts of sodium bicarbonate and 1 part of cuprous chloride are heated in 300 parts of water for 20 hours at 60° C.–70° C. When the reaction is finished, the solution obtained is diluted with water and the dyestuff is separated as barium salt by means of barium chloride. After filtration, the barium salt is dissolved in dilute sodium carbonate solution, the solution is freed from barium carbonate and from the warm filtrate the dyestuff is salted out by means of ammonium chloride.

A dark blue powder is obtained which dissolves very easily in water to a blue solution and dyes wool and silk clear reddish-blue tints of very good evenness.

We claim:
1. The process which comprises heating at a temperature of between about 50° C. and about 100° C. a 1-amino-2-sulfo-4-halogen-anthraquinone compound with an amino-arylsulfonamide compound of the general formula

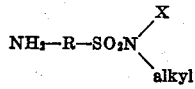

wherein X means hydrogen or a lower alkyl group, R means an aryl radical of the benzene and naphthalene series and alkyl means a lower alkyl group, at least one of the alkyl groups containing a hydroxy group, in the presence of water, a copper salt and an acid binding agent.

2. The process which comprises heating at a temperature of about 60° C. to about 70° C., a 1-amino-2-sulfo-4-bromo-anthraquinone compound with an amino-arylsulfonamide compound of the general formula

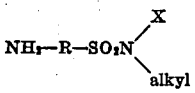

wherein X means hydrogen or a lower alkyl group, R means an aryl radical of the benzene and naphthalene series and alkyl means a lower alkyl group, at least one of the alkyl groups containing a hydroxy group, in the presence of water, a copper salt and an acid binding agent.

3. The process which comprises heating at a temperature of about 60° C. to about 70° C. a 1-amino-2-sulfo-4-bromo-anthraquinone compound with an amino-arylsulfonamide compound of the general formula

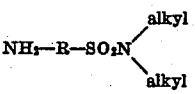

wherein R means an aryl radical of the benzene series and alkyl means a lower alkyl group, at least one of the alkyl groups containing a hydroxy group, in the presence of water, a copper salt and an acid binding agent.

4. The process which comprises heating at a temperature of about 60° to about 70° C. sodium-1-amino-4-bromo-anthraquinone-2-sulfonate with meta-aminophenylsulfonic acid-dihydroxy-ethylamide in the presence of water, cuprous chloride and sodium bicarbonate until the formation of the dyestuff is completed.

5. The process which comprises heating at a temperature of about 60° C. to about 70° C. sodium-1-amino-4-bromo-anthraquinone-2-sulfonate with 1-amino-benzene-4-sulfonic acid-dihydroxy-ethylamide in the presence of water, cuprous chloride and sodium bicarbonate until the formation of the dyestuff is completed.

6. The process which comprises heating at a temperature of about 60° C. to about 70° C. sodium-1-amino-4-bromo-anthraquinone-2-sulfonate with 1-methyl-2-aminobenzene-4-sulfonic acid-methyl-hydroxyethylamide in the presence of water, cuprous chloride and sodium bicarbonate until the formation of the dyestuff is completed.

7. The anthraquinone compounds containing in 1-position a NH$_2$-group, in 2-position a sulfo-group and in 4-position a

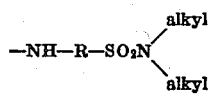

group wherein X means hydrogen or a lower alkyl group, R means an aryl radical of the benzene and naphthalene series and alkyl means a lower alkyl group, at least one of the alkyl groups containing a hydroxy group.

8. The anthraquinone compounds containing in 1-position a NH$_2$-group, in 2-position a sulfo-group and in 4-position a $$-NH-R-SO_2N\begin{matrix}alkyl\\alkyl\end{matrix}$$

group wherein R means an aryl radical of the benzene series and alkyl means a lower alkyl group, at least one of the alkyl groups containing a hydroxy group.

9. The compound of the formula:

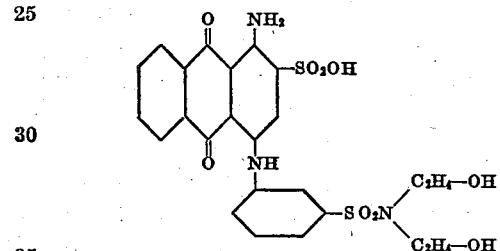

forming a crystalline powder which is very easily soluble in water and dyeing wool and silk very clear, somewhat reddish blue tints of very good evenness.

10. The compound of the formula:

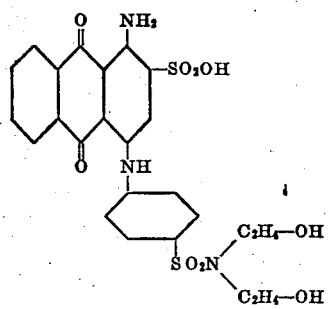

forming a crystalline powder and dyeing wool and silk very clear, somewhat reddish blue tints of very good evenness.

11. The compound of the formula:

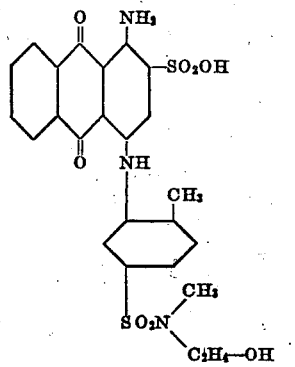

dyeing wool and silk clear blue tints of very good evenness.

ERNST DIEFENBACH.
ERICH FISCHER.